United States Patent [19]

Alfano

[11] Patent Number: 5,295,406
[45] Date of Patent: Mar. 22, 1994

[54] LOAD LOCK FOR BALL NUT AND SCREW MECHANISM

[75] Inventor: Don C. Alfano, Rockford, Ill.

[73] Assignee: Dana Corporation, Toledo, Ohio

[21] Appl. No.: 949,710

[22] Filed: Sep. 23, 1992

[51] Int. Cl.⁵ .......................... F16H 1/16; F16H 55/17
[52] U.S. Cl. .................... 74/424.8 R; 74/459
[58] Field of Search ............... 74/89.15, 424.8 R, 459

[56] References Cited

U.S. PATENT DOCUMENTS

| 2,783,656 | 3/1957  | Fisher         | 74/459      |
|-----------|---------|----------------|-------------|
| 2,833,157 | 5/1958  | Gates          | 74/459      |
| 2,855,790 | 10/1958 | Smith          | 74/459      |
| 2,876,653 | 3/1959  | Meyer          | 74/424.8 R  |
| 2,995,947 | 8/1961  | Grabowski      | 74/459      |
| 2,995,948 | 8/1961  | Galonska et al.| 74/459      |
| 3,592,072 | 7/1971  | Nilsson        | 74/459      |
| 3,869,936 | 3/1975  | Taillardat     | 74/459      |
| 5,142,929 | 9/1992  | Simpson, III   | 74/424.8 R  |

Primary Examiner—Rodney H. Bonck
Assistant Examiner—David W. Laub
Attorney, Agent, or Firm—MacMillan, Sobanski & Todd

[57] ABSTRACT

A ball screw and nut mechanism includes an elongated cylindrical screw having an outer helically threaded surface which extends through a cylindrical opening formed through a nut having a complementary helically threaded surface. A plurality of balls are disposed between the screw and the nut, each extending partially into both of the complementary threads to provide a rolling engagement between the screw and the nut. A load lock is provided to prevent the nut from moving axially relative to the screw when the balls are not present in the threads. The load lock includes a wire member which is generally helical in shape, having a pitch which is approximately equal to the pitch defined by the cooperating threads. The wire member is threaded partially through the threads, but does not normally inhibit rotation of the screw relative to the nut. The wire member is formed having a tang portion on one end thereof. The tang portion is adapted to be received within one of a plurality of recesses formed in an end face of the nut when the wire member is threaded therein. The cooperation of the tang portion with the recess functions to retain the wire member in position within the nut.

6 Claims, 1 Drawing Sheet

LOAD LOCK FOR BALL NUT AND SCREW MECHANISM

BACKGROUND OF THE INVENTION

This invention relates in general to ball nut and screw mechanisms and in particular to an improved structure for a load lock adapted for use with such a ball nut and screw mechanism.

The ball nut and screw mechanism is a well known device which is adapted to translate rotary motion into linear motion. Such a mechanism typically includes an elongated cylindrical screw which extends through a cylindrical opening formed through a nut. The outer surface of the screw and the inner surface of the nut are formed having complementary helical threads which are generally semi-circular in cross section. However, the outer diameter of the screw is smaller than the inner diameter of the opening formed through the nut. Thus, the outer surface of the screw and the inner surface of the opening formed through the nut do not engage one another. Rather, a plurality of balls are disposed between the screw and the nut. Each ball extends partially into both of the complementary threads formed in the screw and the nut so as to provide a rolling engagement therebetween, similar to a ball bearing.

Typically, the screw is connected to a source of rotational power, while the nut is secured so as to be non-rotatable. Thus, when the screw is rotated, the nut is moved linearly relative thereto. In some instances, however, the nut is fixed to be stationary, and the screw is moved axially as it rotates. In either event, because of the rolling engagement of the balls with the screw and the nut, such linear movement of the nut or screw is accomplished with very little friction. However, as the screw is rotated, the balls roll throughout the threads formed in the nut. To accommodate this, it is known to provide a means for permitting the balls to circulate from one end of the nut to another in an endless loop. This ball circulation means typically includes a pair of apertures formed through the nut and an external tube extending between the apertures. The apertures extend radially through the nut into communication with the ends of the threads formed therein. The tube has end portions which extend into the apertures. The tips of the end portions of the tube may be formed having integral deflectors which guide the balls into and out of the threads. Thus, when the screw is rotated, the balls roll through the threads toward one end thereof, into one end portion of the tube disposed in one of the apertures, through the tube, out of the other end portion of the tube disposed in the other one of the apertures, and into the other end of the threads.

So long as the balls are retained between the nut and the screw, the ball screw and nut mechanism will function normally. However, it is known that the mechanism can fail if the balls are removed from between the screw and the nut. Most frequently, this occurs when the external ball circulation passageway is accidentally damaged or removed, allowing the balls to fall out of the mechanism. When this happens, the screw and the nut may become free to move axially relative to one another. As a result, the mechanism becomes inoperable. Also, a load carried by the nut may undesirably become free to move suddenly and uncontrollably.

To prevent this from occurring, it is known to provide the ball screw and nut mechanism with a load lock which prevents the nut from moving axially relative to the screw when the balls are not present. Such a load lock is preferably designed such that it does not interfere with the normal operation of the mechanism, but rather only engages the screw and the nut only when the balls are not present in the threads. Many different load locks are commonly available for use in ball screw and nut mechanisms. However, known load locks are typically constructed from multiple components and, as a result, are rather expensive and time consuming to properly install. Thus, it would be desirable to provide an improved structure for a load lock for a ball screw and nut mechanism which is simple and inexpensive in construction and installation.

SUMMARY OF THE INVENTION

This invention relates to an improved structure for a load lock for a ball screw and nut mechanism which is simple and inexpensive in construction and installation. The mechanism includes an elongated cylindrical screw having an outer helically threaded surface which extends through a cylindrical opening formed through a nut having a complementary helically threaded surface. A plurality of balls are disposed between the screw and the nut, each extending partially into both of the complementary threads. The balls provide a rolling engagement between the screw and the nut, similar to a ball bearing. A load lock is provided to prevent the nut from moving axially relative to the screw when the balls are not present in the threads. The load lock includes a wire member which is generally helical in shape, having a pitch which is approximately equal to the pitch defined by the cooperating threads. The wire member is threaded partially through the threads, but does not normally inhibit rotation of the screw relative to the nut. The wire member is formed having a tang portion on one end thereof. The tang portion is adapted to be received within one of a plurality of recesses formed in an end face of the nut when the wire member is threaded therein. The cooperation of the tang portion with the recess functions to retain the wire member in position within the nut. As a result, the wire member is quickly and easily installed within the nut for use.

Various objects of this invention will become apparent to those skilled in the art from the following detailed description of the preferred embodiment, when read in light of the accompanying drawings.

DETAILED DESCRIPTION OF THE PREFERRED EMBODIMENT

Figure 1:
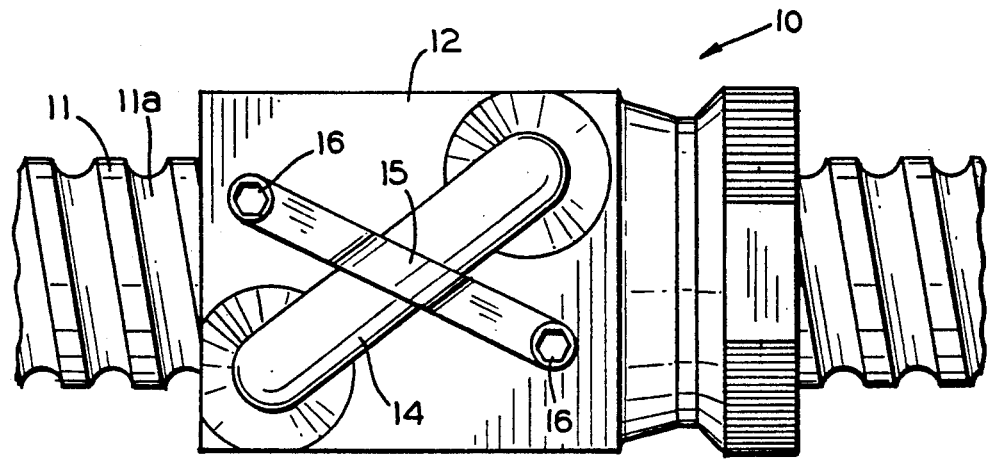
FIG. 1 is an elevational view of a ball screw and nut mechanism.
Figure 2:
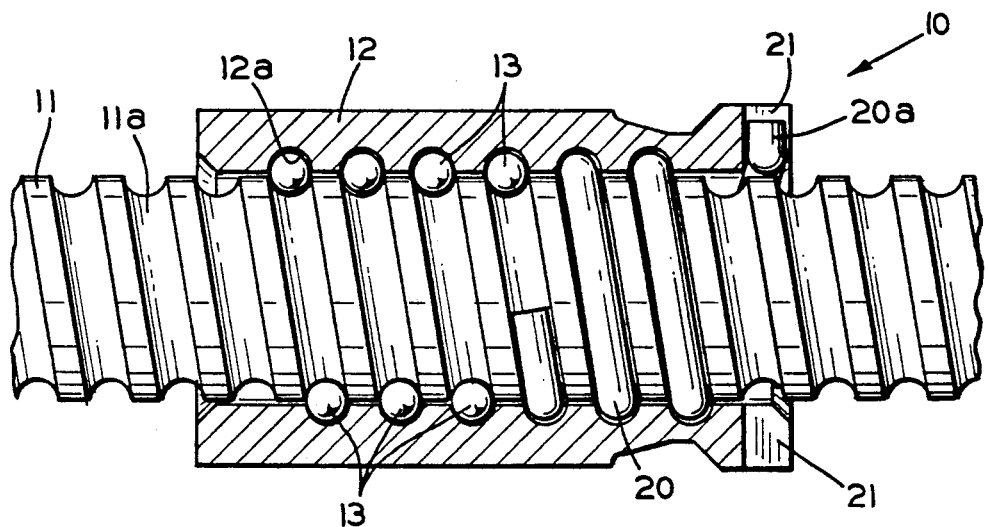
FIG. 2 is an elevational view of the ball screw and nut mechanism illustrated in FIG. 1 partially broken away to show the structure of a load lock mounted therein in accordance with this invention.

Referring now to the drawings, there is illustrated in FIGS. 1 and 2 a ball screw and nut mechanism, indicated generally at 10, in accordance with this invention. The mechanism 10 includes a elongated cylindrical screw 11 having an outer surface which is formed having a helical thread 11a. The screw 11 extends through a cylindrical opening formed through a nut 12. The inner surface of the nut 12 is formed having a helical thread 12a which is complementary in size and shape to the helical thread 11a formed on the outer surface of the screw 11. As best shown in FIG. 2, the helical threads 11a and 12a are generally semi-circular in shape. The outer diameter of the screw 11 is smaller than the inner diameter of the opening formed through the nut 12. Thus, the outer surface of the screw 11 and the inner surface of the nut 12 do not engage one another.

A plurality of balls 13 are disposed between the screw 11 and the nut 12. Each of the balls 13 extends partially into both of the complementary threads 11a and 12a respectively formed in the screw 11 and the nut 12. The balls 13 provide a rolling engagement between the screw 11 and the nut 12, similar to a ball bearing. Typically, the screw 11 is connected to a source of rotational power (not shown), while the nut 12 is secured so as to be non-rotatable. Thus, when the screw 11 is rotated, the nut 12 is moved linearly relative thereto.

Figure 3:
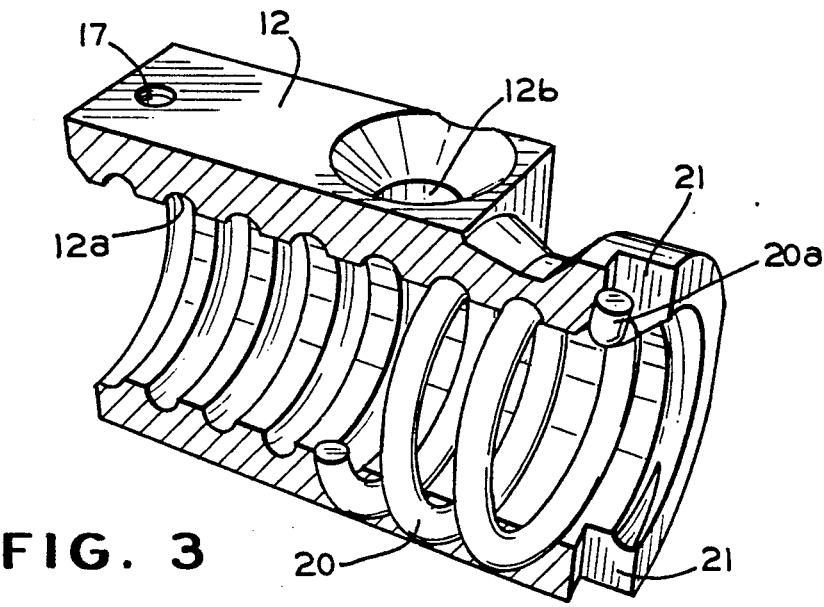
FIG. 3 is a perspective view of a portion of the nut and the load lock illustrated in FIGS. 1 and 2.

As the screw 11 is rotated, the balls 13 roll throughout the thread 12a formed in the nut 12. To accommodate this, means are provided for permitting the balls 13 to circulate from one end of the nut 12 to another in an endless loop. In the illustrated embodiment, this ball circulation means includes a pair of apertures 12b (only one is illustrated in FIG. 3) which are formed through the nut 12. The apertures 12b extend radially through the nut 12 into communication with the ends of the thread 12a formed therein.

Additionally, the ball circulation means includes a tube 14 extending across the outer surface of the nut 12. The tube 14 has end portions (not shown) which extend into the apertures 12b. The tips of the end portions of the tube 12 may be formed having integral deflectors which guide the balls 13 into and out of the threads 11a and 12a. Thus, when the screw 11 is rotated, the balls 13 roll through the threads 11a and 12a toward one end thereof, into one end portion of the tube 14 disposed in one of the apertures 12b, through the tube 14, out of the other end portion of the tube 14 disposed in the other one of the apertures 12b, and into the other end of the threads 11a and 12a. A strap 15 is provided for retaining the tube 14 on the nut 12. The strap 15 may be secured to the outer surface of the nut 12 by threaded fasteners 16 extending into corresponding threaded apertures 17 (only one is illustrated in FIG. 3) formed in the nut 12. The structure of the ball screw and nut mechanism 10 thus far described is conventional in the art.

A load lock is provided to prevent the nut 12 from moving axially relative to the screw 11 when the balls 13 are not present in the threads 11a and 12a. In the illustrated embodiment, the load lock includes a wire member 20. The wire member 20 has a generally circular cross section defining a diameter which is slightly smaller than the diameter of the ball 13. The wire member 20 is also generally helical in shape, having a pitch which is approximately equal to the pitch defined by the cooperating threads 11a and 12a. Thus, as shown in FIGS. 2 and 3, the wire member 20 can be threaded partially through the threads 11a and 12a. However, the wire member 20 does not engage the surfaces of such threads 11a and 12a so as to inhibit rotation of the screw 11 relative to the nut 12.

The wire member 20 is formed having a tang portion 20a on one end thereof. In the illustrated embodiment, the tang portion 20a extends generally radially relative to the longitudinal axis defined by the helical wire member 20. The tang portion 20a is adapted to be received within one of a pair of recesses 21 formed in an end face of the nut 12 when the wire member 20 is threaded therein. To accomplish this, the wire member 20 is threaded into the nut 12. As the wire member 20 is so threaded, the tang portion 20a is simultaneously rotated and advanced axially toward the end face of the nut 12. After a certain amount of this rotational and axial movement, the tang portion 20a will engage the end surface of the nut 12. Thereafter, rotational movement of the wire member 20 is continued, causing the tang portion 20a to slide along the end surface of the nut 12 as it rotates relative thereto. As the tang portion 20a slides and rotates, the remainder of the wire member 20 is rotated and advanced axially within the nut 12. Consequently, the tang portion 20a is deflected as the wire member 20 is advanced within the nut 12. This deflection continues until the tang portion 20a is rotated into alignment with one of the recesses 21, at which time it snaps into cooperation with the recess 21.

The cooperation of the tang portion 20a with the recess 21 functions to retain the wire member 20 in position within the nut 12, preventing relative rotation therebetween. As a result, the wire member 20 is quickly and easily installed within the nut 12 for use. The resilient engagement of the tang portion 20a with the recess 21 prevents the accidental removal of the wire member 20 from the nut 12. However, such wire member 20 can be removed from the nut 12 simply by gripping the tang portion 20a with a tool (such as a pair of needle-nose pliers), deflecting the tang portion 20a out of engagement with the recess 21, and rotating the wire member 20 in the opposite direction relative to the nut 12.

In operation, the wire member 20 is installed within the nut 12 as described above. During normal operation of the ball screw and nut mechanism 10, the wire member 20 does not engage the surfaces of the threads 11a and 12a with any significant force. Thus, the wire member 20 does not inhibit rotation of the screw 11 relative to the nut 12. However, if the balls are removed from the threads 11a and 12a, the wire member 20 serves to prevent the nut 12 from moving axially relative to the screw 11. This is accomplished by the engagement of the wire member 20 with the threads 11a and 12a in the absence of the balls 13. Thus, the wire member 20 functions as a load lock only when the balls 13 are not present within the mechanism 10.

In the illustrated embodiment, the nut 12 is described and illustrated as having a single continuous thread helical thread 12a formed in the inner surface thereof. For that embodiment, a single wire member 20 is provided as a load lock. However, it is well known that the nut 12 may be formed having two or more separate helical threads which extend adjacent to one another throughout the length thereof. For those nuts 12, a separate wire member 20 may be provided in each of the helical threads as separate load locks. To accommodate this, the end face of the nut 12 would be formed having a sufficient number of recesses 21 for receiving the respective tang portion 20a, in the manner described above.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A ball screw and nut assembly comprising:
   a screw including an outer surface which is formed having a thread;
   a nut including an opening formed therethrough defining a longitudinal axis and an interior surface which is formed having a thread, said nut thread being complementary to said screw thread, said nut further including an axially facing exterior end surface having a recess formed therein;
   a plurality of balls disposed between said screw and said nut, each of said balls extending partially into both of said screw thread and said nut thread; and
   a wire member including a first portion and a second portion, said first portion being disposed between said screw and said nut and extending partially into both of said screw thread and said nut thread, said second portion being disposed within said recess of said exterior end surface.

2. The ball screw and nut assembly defined in claim 1 wherein said nut is formed having a pair of exterior surfaces defining respective exterior end surfaces, and wherein said recess is formed in one of said exterior end surfaces.

3. The ball screw and nut assembly defined in claim 1 wherein a plurality of recesses are formed in said exterior end surface of said body portion.

4. A nut adapted for use in a ball screw and nut assembly comprising:
   a body portion including an exterior end surface having a recess formed therein; and
   an opening formed through said body portion defining a longitudinal axis and an interior surface which is formed having a thread, said exterior end surface facing axially relative to said longitudinal axis.

5. The nut defined in claim 4 wherein said body portion is formed having a pair of exterior surfaces defining respective exterior end surfaces, and wherein said recess is formed in one of said exterior end surfaces.

6. The nut defined in claim 4 wherein a plurality of recesses are formed in said exterior end surface of said body portion.

* * * * *

UNITED STATES PATENT AND TRADEMARK OFFICE
CERTIFICATE OF CORRECTION

PATENT NO. : 5,295,406
DATED : March 22, 1994
INVENTOR(S) : Don C. Alfano It is certified that error appears in the above-identified patent and that said Letters Patent is hereby corrected as shown below:

Claim 3, Column 6, Line 5, change "body portion" to -- nut --.

Signed and Sealed this

Twelfth Day of July, 1994

*Attest:*

BRUCE LEHMAN

*Attesting Officer*        *Commissioner of Patents and Trademarks*